(12) United States Patent
Najer et al.

(10) Patent No.: US 12,474,773 B2
(45) Date of Patent: Nov. 18, 2025

(54) EYE MOVEMENT DETERMINATION (71) Applicant: ams International AG, Jona (CH)

(72) Inventors: Daniel Najer, Eindhoven (NL); Jens Geiger, Eindhoven (NL); Ferran Suarez, Eindhoven (NL); Laurent Nevou, Eindhoven (NL); Svenja Mauthe, Eindhoven (NL)

(73) Assignee: ams International AG, Jona (CH)

( * ) Notice: Subject to any disclaimer, the term of this patent is extended or adjusted under 35 U.S.C. 154(b) by 156 days.

(21) Appl. No.: 18/562,445

(22) PCT Filed: May 3, 2022

(86) PCT No.: PCT/EP2022/061864
§ 371 (c)(1),
(2) Date: Nov. 20, 2023

(87) PCT Pub. No.: WO2022/243027
PCT Pub. Date: Nov. 24, 2022

(65) Prior Publication Data
US 2024/0310906 A1 Sep. 19, 2024

(30) Foreign Application Priority Data
May 20, 2021 (GB) ...................... 2107238

(51) Int. Cl.
*G06F 3/01* (2006.01)
*G02B 27/00* (2006.01)
*G02B 27/01* (2006.01)

(52) U.S. Cl.
CPC ......... *G06F 3/013* (2013.01); *G02B 27/0093* (2013.01); *G02B 27/017* (2013.01)

(58) Field of Classification Search
None
See application file for complete search history.

(56) References Cited

U.S. PATENT DOCUMENTS 5,717,413 A 2/1998 Mizouchi
11,868,522 B2 1/2024 Fiess et al.
(Continued)

FOREIGN PATENT DOCUMENTS

CN 112639555 A 4/2021
JP H7261728 A 10/1995
(Continued)

OTHER PUBLICATIONS

Japanese Reasons for Rejection issued for the corresponding JP patent application No. JP 2023-571730, dated Jan. 28, 2025, 10 pages (For informational purposes only).
(Continued)

*Primary Examiner* — Nicholas J Lee
(74) *Attorney, Agent, or Firm* — VIERING, JENTSCHURA & PARTNER mbB (57) ABSTRACT

A method for operating a display of a virtual reality or augmented reality headset includes determining a direction of movement of a user's eye, estimating a future gaze direction from the determined direction of movement, and rendering an image on the display having higher resolution image data in a region including the estimated gaze direction and lower resolution image data outside of the region including the determined gaze direction. The determining the direction of movement of the user's eye includes illuminating the user's eye with a beam of light emitted by a first laser, receiving, at the first laser, light redirected from the user's eye_such that self-mixing interference occurs within the laser cavity between light generated by the first laser and the light redirected from the user's eye, measuring the self-mixing interference, and determining a direction of movement of the user's eye-from the measured self-mixing interference.

16 Claims, 7 Drawing Sheets

(56) References Cited

U.S. PATENT DOCUMENTS

| | | |
|---|---|---|
| 2015/0206321 A1 | 7/2015 | Scavezze et al. |
| 2017/0261610 A1 | 9/2017 | Scally et al. |
| 2017/0316264 A1 | 11/2017 | Gustafsson et al. |
| 2018/0205943 A1 | 7/2018 | Trail |
| 2019/0041634 A1 | 2/2019 | Popovich et al. |
| 2019/0317454 A1 | 10/2019 | Holenarsipur et al. |
| 2019/0354173 A1 | 11/2019 | Young et al. |
| 2020/0143516 A1* | 5/2020 | Martin .................. G06T 3/60 |
| 2021/0271320 A1 | 9/2021 | Fiess et al. |
| 2021/0373659 A1* | 12/2021 | Petersen .............. G06F 3/017 |

FOREIGN PATENT DOCUMENTS

| | | |
|---|---|---|
| KR | 20160111942 A | 9/2016 |
| KR | 20210031597 A | 3/2021 |
| WO | 2020043472 A1 | 3/2020 |
| WO | 2021049740 A1 | 3/2021 |

OTHER PUBLICATIONS

Iwamoto, K., et al., "Study on Acceptable Time Delay of Displayed Image for Eye Movement in the Eye Movement Tracking Type Image Display System", The Japanese Journal of Ergonomics, Journal of the Japan Ergonomics Society, vol. 40, Issue 1, Feb. 15, 2004, pp. 39-47.

Japanese Notice of Reasons for Refusal for corresponding Japanese Patent Application No. 2023-571730, dated Dec. 3, 2024, 5 pages (for informational purposes only).

Search Report for corresponding British Patent Application No. 2107238.4, dated Nov. 16, 2021, 4 pages (for informational purposes only).

Iwamoto, Kazuyo et al.; "Study on acceptable time delay of displayed image for eye movement in the eye movement tracking type image display system"; The Japanese Journal of Ergonomics; vol. 40 Issue 1; retrieved from https://www.jstage.jst.go.jp/article/je1965/40/1/40_1_39/_article/-char/en on Dec. 12, 2024; dated 2004; pp. 39-47.

Capelli, Giorgio et al., "Laser velocimeter for the measurement of eye movements", 2011 International Workshop on Biophotonics, Jun. 2011, 3 pages.

International Search Report issued for the corresponding PCT patent application No. PCT/EP2022/061864, dated Sep. 5, 2022, 4 pages (For informational purposes only).

Sarkar, N., et al., "A Resonant Eye-Tracking Microsystem for Velocity Estimation of Saccades and Foveated Rendering", MEMS, 2017, pp. 304-307.

Meyer, J., et al., "A Novel Camera-Free Eye Tracking Sensor For Augmented Reality based on Laser Scanning", IEEE Sensors Council, 2017, 9 pages.

Meyer, J., et al., "Low Power Scanned Laser Eye Tracking for Retinal Projection AR Glasses", ETRA, Jun. 2020, Germany, 3 pages.

Sangu, S., et al., "Ultracompact eye annd pupil tracking device using VCSEL arrays and position sensitive detector", Proceedings of SPIE, USA, 2020, 12 pages.

Meyer Johannes et al., "A nove-Eye-Tracking Sensor for AR Glasses based on Laser Self-Mixing Showing Exceptional Robustness Against Illumination", Germany, 2020, 5 pages.

Li, Tianxing et al., "Battery-Free Eye Tracker on Glasses", MobiCom 2018, dated 2018, 7 pages.

Dietrich, Marc Philipp et al., "Towards EEG-Based Eye-Tracking for Interaction Design in Head-Mounted Devices"; retrieved from https://www.google.com/url?sa=t&source=web&rct=j&opi=89978449&url=https://downloads.hci.informatik.uni-wuerzburg.de/Dietrich2017.aa.pdf&ved=2ahUKEwii36Dtl6iNAxW4RkEAHU7wDGQQFnoECBgQAQ&usg=AOvVaw2bcmGU3Y9ttFG_pznpWAYo on May 16, 2025, dated 2017.

Halfacree, Gareth; "Nvidia shows off next-generation AR glasses prototypes"; retrieved from https://www.bit-tech/net/news/tech/peripherals/nvidia-shows-off-next-generation-ar-glasses-prototypes/1/ on May 16, 2025; dated Jul. 30, 2019; 4 pages.

Sarkar, N. et al., "A large angle, low voltage, small footprint micromirror for eye tracking and near-eye display applications", IEEE 18th International Conference on Solid-State Sensors, Actuators and Microsystems, 2015, 4 pages.

Arar, Nuro Murat; "Robust Eye Tracking Based on Adaptive Fusion of Multiple Cameras", Éole Polytechnique Fédérale De Lausanne; retrieved from https://www.google.com/url?sa=t&source=web&rct=j&opi=89978449&url=https://infoscience.epfl.ch/record/231152/files/EPFL_TH7933.pdf&ved=2ahUKEwiYpcXOmKiNAxWvYEEAHf31FLUQFnoECBwQAQ&usg=AOvVaw3f3amNSR43xc4jA1tkcVyD on May 16, 2025; dated 2017; 168 pages.

Sarkar, Neil; "Neil Sarkar (AdHawk Microsystems): Ultra-Fast Eye Tracking Without Cameras for Mobile AR Headsets"; retrieved from https://www.youtube.com/watch?v=JEg4I5KuQgl on May 16, 2025; dated 2019; 2 pages.

"How do Tobii eye trackers work?"; retrieved from https://www.tobiipro.com/learn-and-support/learn/eye-tracking-essentials/how-do-tobii-eye-trackers-work/ on May 16, 2025; dated 2024; 2 pages.

Korean office action issued for the corresponding Korean patent application No. 202280036398.7, dated Jul. 7, 2025, 13 pages (for informational purposes only).

Woongbi Cho et al., Highly Sensitive and Cost-Effective Polymeric-Sulfur-Based Mid-Wavelength Infrared Linear Polarizers with Tailored Fabry-Pérot Resonance, Advanced Materials, 2022, 2209377, 13 pages.

Johannes Meyer et al., A Novel Gaze Gesture Sensor for Smart Glasses Based on Laser Self-Mixing, 2021 CHI Conference, 6 pages.

* cited by examiner

EYE MOVEMENT DETERMINATION

CROSS REFERENCE TO RELATED APPLICATION

This application is a National Stage of International Application No. PCT/EP2022/061864, filed on May 3, 2022, which designates the United States and was published in English, and which claims priority to Great Britain Patent Application No. 2107238.4, filed on May 20, 2021, in the Intellectual Property Office. All of the aforementioned applications are hereby incorporated by reference in their entireties.

The present application relates to a virtual reality (VR) or augmented reality (AR) headset and a method for operating a VR or AR headset, in particular, to a device configured to determine eye movement direction from self-mixing interference of a resonant light source and render an image on a display with a higher resolution in the gaze direction of a user.

BACKGROUND

Smart glasses displays, such as those used in virtual reality (VR), augmented reality (AR), or mixed reality (MR) headsets, are known to use foveated rendering. Foveated rendering allows computing power to be saved (and thus power consumption to be reduced and accordingly, battery lifetime to be increased) by computing a high-resolution image only in a narrow solid angle around the direction into which the eye is currently looking (known as the gaze direction). Outside that narrow solid angle, the image produced by the display is a blurred low-resolution image requiring much less processing power. The low resolution of the region outside the gaze direction is not recognized by the user.

Previous state of the art tracking devices utilise a camera for imaging a user's eye, with a number of LEDs for illumination. These camera-based systems involve a large amount of imagine processing, as well operating the LEDs, thus using a large amount of power and having a reduced battery life.

Several state-of-the-art systems model the eye as 2 spheres (the cornea and the eyeball) having different radii and refractive indices. A change in radii or refractive index can be used to determine the perimeter of the cornea and consequently the gaze direction of a user.

Sarkar et al., "A resonant eye-tracking microsystem for velocity estimation of saccades and foveated rendering". IEEE 30th International Conference on Micro Electro Mechanical Systems (MEMS), 304 (2017) relates to smart glasses using a scanning laser, a mirror, and a photodiode to determine eye positions at a given time period. This enables an indirect measurement of eye movement velocity from eye position data. However, this device involves moving parts and requires time-consuming calibration when the glasses move relative to a user. It also relies on the scanning laser identifying the boundary of the cornea, which can be detrimental to eye safety of a user.

Sangu et al., Proceedings of the SPIE 11310, 113101F (2020) relates to eye tracking using a VCSEL array, a concave mirror, and a 2D photosensitive detector. This also relies on illuminating the cornea, which can be detrimental to eye safety of a user, has a large form factor, and does not directly measure the velocity of a user's eye.

Meyer et al. (Bosch)—"Low Power Scanned Laser Eye Tracking for Retinal Projection AR Glasses" relates to laser beam scanning (LBS) display with IR-VCSEL-scanning for eye tracking. This also relies on illuminating the cornea, which can be detrimental to eye safety of a user, and does not directly measure the velocity of a user's eye.

Meyer (Trumpf, Bosch) et al., "A Novel Eye-Tracking Sensor for AR Glasses Based on Laser Self-Mixing Showing Exceptional Robustness Against Illumination" relates to eye tracking using the retina of the eye as a remote reflector for using self-mixing interference to determine the position of a user's eye. This relies on illuminating the retina, which can be detrimental to eye safety of a user, and does not directly measure the velocity of a user's eye.

It is desirable to provide a VR or AR headset with an eye movement direction measuring device that has low power consumption, does not require calibration, has improved user eye safety, and has no moving parts.

SUMMARY

In general, this disclosure proposes to overcome at least some of the above problems by providing a device that uses self-mixing interferometry between light emitted from a resonant light source (such as a laser) and light redirected from a user's eye to directly determine the direction of movement of the user's eye.

Aspects and preferred features are set out in the accompanying claims.

The proposed method and device provides the following advantages:
- the device directly measures direction of movement, providing a more accurate and less power consuming method of measuring direction of movement;
- the device has a very short response time in comparison to state-of-the-art devices;
- the device involves no mechanically moving parts;
- no significant recalibrations are required by users of the device, as there is no requirement for aligning a photodetector or optical elements and no mechanically moving parts;
- embodiments of the disclosure do not require a separate light detector therefore having further reduced power consumption, or utilise a light detector integrated into the resonant light source;
- the device has small form factor compared to state-of-the-art devices;
- the device has no sensitivity to disturbances from ambient light (as the method and device measures interference);
- the device has reduced power consumption and therefore longer battery life;
- operation of the device does not require illumination of the cornea or retina, therefore providing improved eye safety.

The proposed method and device may be used to estimate gaze direction in a VR or AR headset, and to improve foveated rendering. The proposed method and device may also be used for fatigue detection.

According to a first aspect of the present disclosure, there is provided a method for operating a display of a VR or AR headset, the method comprising: determining a direction of movement of a user's eye; estimating a future gaze direction from the determined direction of movement; and rendering an image on the display comprising higher resolution image data in a region comprising the estimated gaze direction and lower resolution image data outside of the region comprising the determined gaze direction, wherein determining a direction of movement of the user's eye comprises: illuminating the user's eye with a beam of light emitted by a first laser;

receiving, at the first laser, light redirected from the user's eye, such that self-mixing interference occurs within the laser cavity between light generated by the first laser and the light redirected from the user's eye; measuring the self-mixing interference; and determining a direction of movement of the user's eye from the measured self-mixing interference.

Redirected light may be used herein to refer to light reflected or scattered from the user's eye.

The method may further comprise determining a speed of movement of the user's eye via self-mixing interferometry (SMI). SMI allows for accurate direction or speed of movement measurements without requiring additional photodiodes for receiving the reflected light. Using SMI, a portion of the emitted light is redirected off the surface of a user's eye and makes its way back to the respective laser. The reflected light coupled back into the laser cavity interferes with the original laser light leading to a modulation of the laser emission characteristics. Measuring the changes in the laser emission characteristics (e.g. laser power output, junction voltage etc.) can provide information about the movement of the user's eye. Rendering an image on the display comprising higher resolution image data in a region comprising the estimated gaze direction and lower resolution image data outside of the region comprising the determined gaze direction, allows a user to view high resolution image in their field of view, whilst reducing processing and power consumption.

The method may directly measure speed or direction of movement of a user's eye. By measuring speed and/or direction directly without measuring a position of a user's eye, the processing power used to measure direction or speed is reduced, and direction and speed of movement measurements can be obtained very fast (at a high frequency) and with greater accuracy. Measuring speed and/or direction of movement of a user's eye allows a prediction of gaze direction of a user. Furthermore, no mechanically moving parts are used, further reducing weight of the device and the power consumption used to measure speed or direction of movement of the user's eye.

Illuminating the user's eye may comprise illuminating only a sclera of the user's eye. Illuminating the user's eye may comprise not illuminating the cornea. The sclera of the user's eye is used herein to refer to an area of the user's eyeball distant from the area of cornea but still between the eyelids. This reduces the effect of erroneous velocity measurements arising due to the shape difference between the cornea (having a smaller diameter and greater curvature) and other regions of the user's eye where the diameter is larger. Such an erroneous velocity measurement could occur if the laser illuminated the cornea region at a first point in time and outside the cornea at a second time. Furthermore, this reduces illumination on the cornea and retina, which can be damaging to a user's eye.

Determining the direction of movement of the user's eye from the self-mixing interference may comprise determining the direction of movement of the user's eye from self-mixing interference caused by a Doppler shift of the redirected light due to movement of the user's eye.

Determining the direction of movement of the user's eye from self-mixing interference caused by a Doppler shift of the redirected light due to movement of the user's eye may comprise performing a Fourier transform on the measured self-mixing interference.

The method may comprise illuminating a user's eye with a beam of light emitted by the first laser in a first direction; illuminating a user's eye with a beam of light emitted by a second laser in a second direction, wherein the second direction is nonparallel to the first direction; receiving, at the first laser, light redirected from the user's eye, such that self-mixing interference occurs within the laser cavity of the first laser between light generated by the first laser and light redirected from the user's eye; receiving, at the second laser, light redirected from the user's eye, such that self-mixing interference occurs within the laser cavity of the second laser between light generated by the second laser and light redirected from the user's eye; measuring the self-mixing interference within the laser cavity of the first laser and measuring the self-mixing interference within the laser cavity of the second laser; determining movement of the user's eye in the first direction from the measured self-mixing interference within the laser cavity of the first laser, and determining movement of the user's eye in the second direction from the measured self-mixing interference within the laser cavity of the second laser. This allows a method for measuring velocity of movement in two directions.

Measuring the self-mixing interference may comprise measuring a voltage or current of the laser. The movement of the user's eye may be determined from a current or voltage input to the respective laser. As the SMI affects the laser output it also affects the power supply to the laser, which can be measured to determine the direction or speed of movement of the user's eye. This allows measurement of the direction and/or speed of the movement of a user's eye without requiring a separate photodetector, thereby reducing power consumption.

Alternatively, SMI may use optical detection, wherein the movement of the user's eye is determined from an optical output of the respective laser source. For example, a photodiode may be placed close to the laser and measure the output intensity of the laser. The photodiode may be integrated in the laser epitaxy or may be located behind the laser and arranged to monitor the power output from a laser mirror opposite to the a mirror through which light passes to the user's eye.

According to a further aspect of the present disclosure, there is provided a virtual reality (VR) or augmented reality (AR) headset comprising: a frame for mounting to a user's head; a device for determining eye movement integrated in or located on the frame, the device comprising: a first laser configured to emit a beam of light for illuminating a user's eye when in use and to receive light redirected from the user's eye, such that self-mixing interference occurs within the laser cavity between light generated by the first laser and the light redirected from the user's eye; a measurement apparatus configured to measure the self-mixing interference; and a processing unit configured to determine a direction of movement of the user's eye from the measured self-mixing interference, wherein the processing unit is further configured to estimate a future gaze direction from the determined direction of movement of the user's eye; and a display configured to render an image on the display comprising higher resolution image data in a display region in the determined future gaze direction and lower resolution image data outside of the display region in the determined future gaze direction.

The first laser may be configured to emit light towards only a sclera of the user's eye (e.g. for a normal range of movement of a user's eye). The sclera of the user's eye is used herein to refer to an area of the user's eyeball distant from the area of cornea but still between the eyelids.

Redirected light may be used herein to refer to light reflected or scattered from the user's eye. Light may be used to refer to visible light, but may also refer to electromagnetic radiation outside the visible spectrum (e.g. infrared radiation).

The processing unit may be further configured to determine speed of movement of the user's eye from the measured self-mixing interference.

The processing unit may be configured to determine the direction of movement of the user's eye from self-mixing interference caused by a Doppler shift of the redirected light due to movement of the user's eye. The Doppler shift may be used herein to refer to the frequency difference between light emitted from the first laser and light redirected from the user's eye, due to movement of the user's eye.

The first laser may be monochromatic (narrowband). The first laser may have a high coherence for accurate direction or speed measurements (e.g. a coherence length greater than 2 cm, more preferably with a coherence greater than 2 m or 200 m).

The first laser may be configured to operate at a wavelength in the infrared or near infrared spectra. For example, the first laser may be configured to emit light having a wavelength in the range of 850 nm to 1500 nm, e.g. at 940 nm. Longer wavelengths are typically better in terms of eye safety, and can therefore be used with a relatively higher output power, which may provide a better signal to noise ratio.

The first laser may comprise a laser diode, such as an edge-emitting laser, a distributed feedback (DFB) laser, or a distributed Bragg reflector (DBR) laser.

The first laser may comprise a vertical cavity surface emitting laser (VCSEL). VCSELS are relatively cheap and have a low power consumption, therefore increasing battery life of the device. Furthermore, VCSELS have a small form factor, therefore providing a more space-saving device.

The measurement apparatus may comprise a photodetector.

The processing unit may be configured to determine a frequency modulation of light incident on the photodetector. The frequency modulation of the light in the laser may be induced by reflected light re-entering the laser cavity.

The first laser may comprise a vertical cavity surface emitting laser (VCSEL) and the photodetector may be integrated with the VCSEL as single semiconductor device. This removes the requirement for recalibration or photodetector alignment.

The photodetector may be spatially separated from the first laser, and the device may further comprise an optical element configured to redirect at least a portion of the self-mixing interference towards the photodetector. The optical element may be a beam splitter or a may be another optical element, such as a cover glass, that can be integrated in the device or in a VR or AR headset or smartglasses including the device.

The measurement apparatus may comprise a sensor configured to measure a voltage input or current input of the laser. This allows measurement of the direction and speed of movement of a user's eye without requiring a separate photodetector. This allows a device with reduced power consumption, smaller form-factor, and increased flexibility in design arrangement of the device. As there is no requirement for separate light detectors, the device is simpler and more cost-effective to implement and manufacture, with a higher production yield and greater design freedom.

The first laser may be configured to emit the beam of light such that an optical axis of the emitted beam of light forms an acute angle with respect to a surface of the user's eye. This angle may be referred to as the angle of incidence of the first laser. As the beam of light may be at an acute angle and not normal to the surface of the user's eye, the beam may have a component in the direction of movement of the user's eye during rotation of the user's eye and undergo a Doppler shift due to the rotation of the user's eye.

The device may comprise a first pair of lasers each configured to emit a beam of light for illuminating the user's eye when in use, wherein the first pair of lasers may comprise the first laser and a second laser. The first laser may be configured to emit light in a first direction, and the second laser may be configured to emit light in a second direction, wherein the second direction is nonparallel to the first direction.

The second laser may operate in a similar manner to the first laser. However, the second laser may be configured to emit light in a different direction. The second laser may be also configured to emit a beam of light for illuminating a user's eye when in use and to receive light redirected from the user's eye, such that self-mixing interference occurs within a laser cavity of the second laser between light generated by the second laser and the light redirected from the user's eye. The device may further comprise a second measurement apparatus configured to measure the self-mixing interference of the second laser. The processing unit may be further configured to determine a direction of movement of the user's eye from the measured self-mixing interference from the second laser.

The device may comprise a second pair of lasers each configured to emit a beam of light for illuminating the user's eye when in use, wherein the second pair of lasers may comprise a third laser and a fourth laser. The third laser may be configured to emit light in a direction parallel to the first direction and the fourth laser may be configured to emit light in a direction parallel to the second direction.

The device may configured such that an offset of the emitted beam of light from the first laser relative to a first plane bisecting the centre of the user's eye is equal to an offset of the emitted beam of light from the third laser relative to the first plane bisecting the centre of the user's eye, and the device may be configured such that an offset of the emitted beam of light from the second laser relative to a second plane bisecting the user's eye is equal to an offset of the emitted beam of light from the fourth laser relative to the second plane bisecting the user's eye. The first and third lasers may be configured to emit light in a direction parallel to the first plane and the second and fourth lasers may be configured to emit light in a direction parallel to the second plane.

Having the beams from the third laser and the first laser parallel and with an equal offset relative to a plane bisecting the centre of the user's eye, means that the angle of incidence of the emitted beam of light from the first laser can be configured to be equal to an angle of incidence of the emitted beam of light from the third laser. Similarly, having the beams from the second laser and the fourth laser parallel and with an equal offset relative to a plane bisecting the centre of the user's eye, means that the the angle of incidence of the emitted beam of light from the second laser can be configured to be equal to the angle of incidence of the emitted beam of light from the fourth laser. With this configuration, the first and third lasers can be used to measure the same component of the eye velocity vector as each other, and the second and fourth lasers can be used to measure the same velocity vector as each other. These can then be cross-checked relative to each other.

The third laser may be configured to emit light in a third direction, wherein the third direction is different to the first direction, and the fourth laser may configured to emit light in a fourth direction different to the second direction and non-parallel to the third direction.

With this configuration, the first and second pairs of lasers measure the same absolute value of the eye velocity vector.

The first pair of lasers may be configured to illuminate a first region of the user's eye and the second pair of lasers may be configured to illuminate a second region of the user's eye, where the second region is distant from the first region.

BRIEF DESCRIPTION OF THE DRAWINGS

Some embodiments of the disclosure will now be described, by way of example only and with reference to the accompanying drawings, in which.

DETAILED DESCRIPTION OF THE PREFERRED EMBODIMENTS

Generally speaking, the disclosure provides a method for operating a display of a VR or AR headset including determining eye movement from self-mixing interference of a resonant light source, and a corresponding VR or AR headset.

Some examples of the solution are given in the accompanying Figures.

Figure 1:
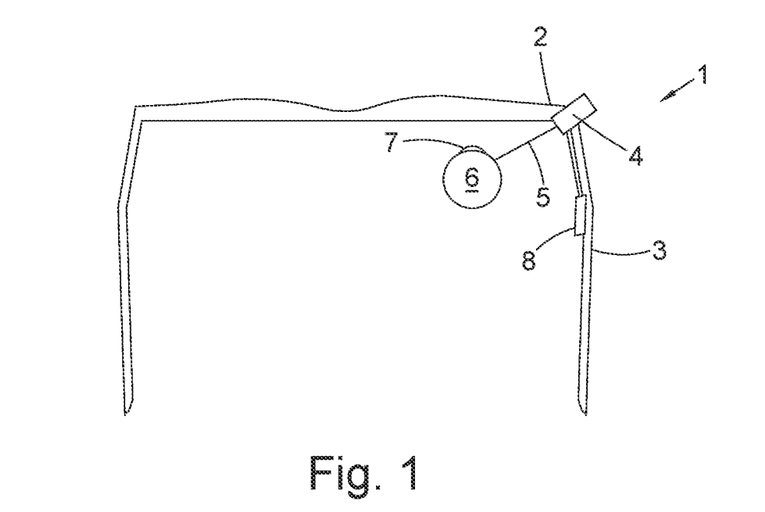
FIG. 1 illustrates a schematic top-view of a VR or AR headset including a device for determining eye movement.

FIG. 1 illustrates a schematic top-view of a device for determining eye movement integrated in a pair of smart glasses 1 (for example, a virtual reality (VR), augmented reality (AR) or mixed reality (MR) headset) including a frame 2 having a stem 3.

The device includes a laser 4 (for example, a VCSEL laser) configured to emit a laser beam 5 to illuminate the user's eye 6. A portion of the laser beam 5 is redirected (reflected or scattered) back from the user's eye 6 and back into the laser 4. Hence, the laser 4 is also a receiver unit for receiving the redirected light. The redirected light interferes with the emitted beam of light in the laser cavity of the laser 4 through self-mixing interference (SMI), which changes the output of the laser 4. By monitoring the output intensity of the laser 4 (or the input voltage or input current to the laser 4), the direction and speed of movement of the user's eye 6 can be determined. The device also includes a processing unit 8 for determining the direction and speed of movement of the user's eye 6 based on SMI.

Figure 7:
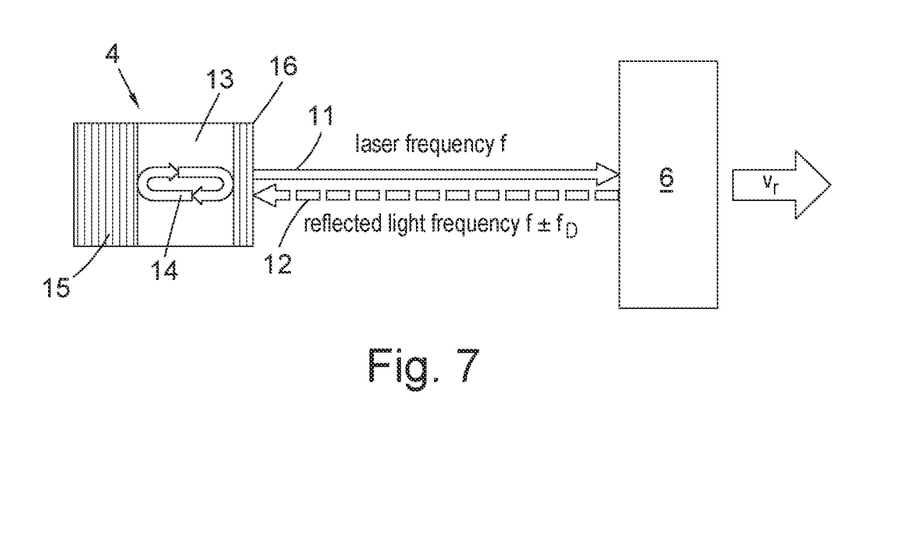
FIG. 7 illustrates a schematic of a laser used in a device for determining eye movement.

The processing unit 8 is configured to determine the direction and speed of movement of the user's eye from self-mixing interference caused by a Doppler shift of the redirected light due to movement of the user's eye, as described in relation to FIG. 7. This allows for direct velocity measurements.

The laser beam may illuminate the sclera (the area outside of the cornea 7) of the eye 6 of the user/wearer of the glasses. This reduces the effect of erroneous velocity measurements arising due to the shape difference between the cornea region 7 (having a smaller diameter and greater curvature) and other regions of the user's eye 6 where the diameter is larger. Such an erroneous velocity measurement could occur if the laser illuminated the cornea region 7 at a first point in time and outside the cornea 7 at a second time. Furthermore, this reduces illumination on the cornea 7 and retina, which can be damaging to a user's eye 6.

In the example shown in FIG. 1, the laser 4 is located in a corner (or temple) of the frame 2 of the glasses, however the laser 4 may be located elsewhere including on the bridge of the frame 2. In the example shown, the processing unit 8 is located on the stem 3 but may be located elsewhere on the glasses.

A display may be located in the frame 2 of the smart glasses. The processing unit may be used to determine a future gaze direction of a user, and the display may be configured to use foveated rendering to display a high-resolution image only in a narrow solid angle around the direction into which the eye is looking (the gaze direction). Outside that narrow solid angle, the image produced by the display is a blurred low-resolution image requiring much less processing power.

Figure 2:
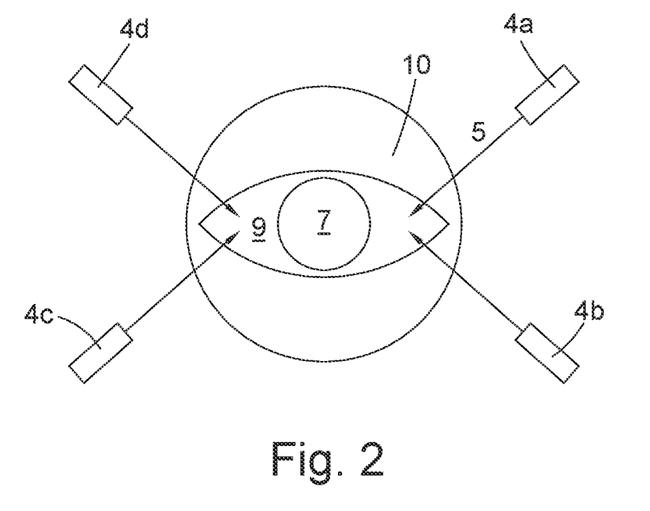
FIG. 2 illustrates a schematic cross-section of a device for determining eye movement, including two pairs of lasers.

FIG. 2 illustrates a schematic front-view of a device for determining eye movement, including two pairs of lasers. The device includes a first pair of lasers 4a, 4b and a second pair of lasers 4c, 4d.

Each laser 4 is configured to emit a laser beam 5 to illuminate the user's eye 6. A portion of the laser beam 5 is redirected back from the user's eye 6 and back into the laser 4. Hence, the laser 4 is also a receiver unit for receiving the redirected light. The redirected light interferes with the emitted beam of light in the laser cavity of the laser 4 through self-mixing interference (SMI), which changes the output of the laser 4. By monitoring the output intensity of the laser 4 or the input voltage or input current to the laser 4, the direction and speed of movement of the user's eye 6 can be determined. The device also includes a processing unit (not shown) for determining the direction and speed of movement of the user's eye 6 based on the measured SMI.

The first laser 4a of the first pair of lasers is configured to emit light in a first direction to measure a component of the velocity of movement of the user's eye in the first direction. The second laser 4b of the first pair of lasers is configured to emit light in a second direction, where the second direction is non-parallel to the first direction in order to measure a component of the velocity of movement of the user's eye in a direction different to the first direction. The second laser 4b of the first pair of lasers may be configured to emit light in a direction orthogonal to the first laser 4a, to measure the component of movement in a direction perpendicular to the first direction.

The laser beams may illuminate the sclera 9 (the area between the open eyelids 10 and outside of the cornea 7) of the eye 6 of the user. This reduces the effect of erroneous velocity measurements arising due to the shape difference between the cornea region 7 (as noted above). It also reduces illumination on the cornea and retina, which can be damaging to a user's eye 6.

The first pair of lasers 4a, 4b are configured to illuminate a first region or point on the user's eye and the second pair of lasers 4c, 4d are configured to illuminate a second region or point on the user's eye, where the second point is spaced from the first region. In this example, the first point is spaced from the cornea in a first direction and the second point is spaced from the cornea in a second direction. In other words, the first and second regions (or points) are on opposite sides of the cornea region 7.

Figure 3:
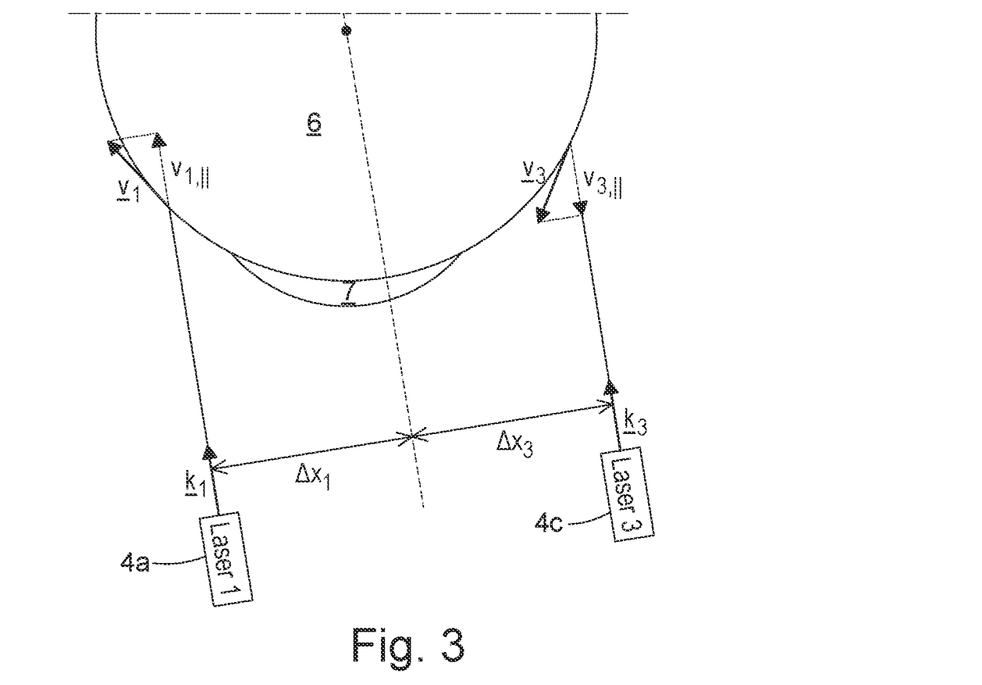
FIG. 3 illustrates a schematic of two lasers illuminating a user's eye.

In an embodiment, the first laser 4c of the second pair of lasers can be configured emit light in a direction parallel to the direction of light emitted by the first laser 4a of the first pair of lasers. The second laser 4d of the second pair of lasers can be configured to emit light in a direction parallel to the direction of light emitted by the second laser 4b of the first pair of lasers. This configuration is shown in FIG. 3.

When this configuration is used, the first lasers 4a, 4c should (when the lasers 4a, 4c illuminate the eyeball outside the cornea region 7 of an approximately spherical eyeball) determine the same velocity component $v_{1,\|}$, $v_{3,\|}$ but with an opposite sign. As shown in FIG. 3, an offset $\Delta x_1$ of the emitted beam of light from the first laser 4a relative to a first plane which bisects the user's eye 6 is equal to an offset $\Delta x_3$ of the emitted beam of light from the third laser 4c relative to the first plane bisecting the user's eye 6. This ensures that the angles of incidence of the angles of incidence of the first lasers 4a, 4c are identical. This allows the first lasers 4a, 4c to measure the same absolute velocity component parallel to the laser beam $v_\|$ of the eyeball tangential velocity vector v. The determined velocity components will be identical, except for the sign. This means that the measured direction or speed of movement of the user's eye 6 can be crosschecked, and any incorrect velocities that are measured if a laser beam accidentally hits the cornea instead of the eyeball can be identified. This also applies to the second lasers 4b, 4d (not depicted).

Figure 4:
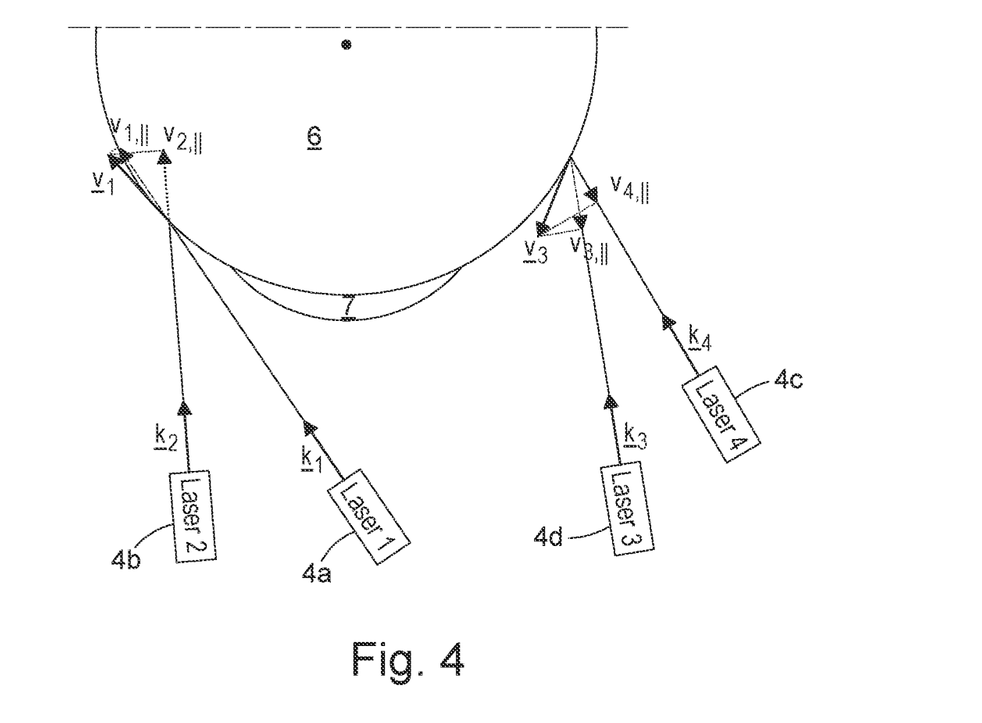
FIG. 4 illustrates a schematic of two pairs of lasers illuminating a user's eye.

Alternatively, the first laser 4c of the second pair of lasers can be configured emit light in a direction $k_3$ different to the first direction $k_1$ of light emitted by the first laser 4a of the first pair of lasers. Similarly, the second laser 4d of the second pair of lasers can be configured to emit light in a direction $k_4$ different to the second direction $k_2$, of light emitted by the second laser 4b of the second pair of lasers. This is shown in FIG. 4. This embodiment does not require any of the lasers to emit light in a direction parallel to each other, and the four lasers may each emit light in a different direction to each other. Each pair of lasers can be used to measure the absolute value $|v_1|$, $|v_3|$ of the eye velocity vector using the measured velocity components parallel to the laser beams $v_\|$. The absolute value $|v_1|$, $|v_3|$ of the eye velocity vector can then be cross-checked using both pairs of lasers, By using two pairs of lasers, the measured velocities can be crosschecked or averaged between the two pairs. Furthermore, the effect of erroneous velocity measurements arising due to the shape difference between the cornea region 7 and other regions of the user's eye 6, can be eliminated by rejecting velocities determined by the pair of lasers illuminating the cornea. The location of the cornea 7, used to determine which velocity measurements to disregard, can be determined from the gaze direction.

Thus, use of two pairs of laser simplifies and increases the precision of the determination of the direction and speed of movement of the user's eye, and the determination is more robust and stable.

Whilst FIG. 2 shows two pairs of lasers, the device may operate with a single laser 4 or only one pair of lasers. Each laser can detect the component of velocity of movement of the user's eye in a direction parallel to the beam of light 5 emitted from an individual laser 4.

In embodiments with two pairs of lasers, the first pair of lasers may be located on the temples or stem of the glasses, and the second pair of lasers may be located on the bridge of the glasses.

Figure 5:
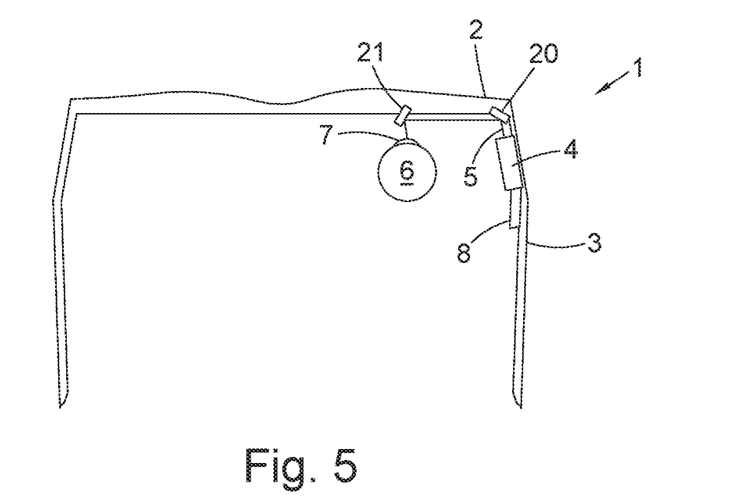
FIG. 5 illustrates a schematic top-view of an alternative VR or AR headset including a device for determining eye movement.

Alternatively, the device may include a laser on the temple of the glasses and a holographic reflector located in front of the lenses of the glasses to redirect the laser beams towards the user's eye, as shown in FIG. 5.

FIG. 5 shows an eye tracking device integrated in a pair of glasses 1 (e.g. AR smart glasses) comprising a frame 2 having a stem 3. In this embodiment, the device comprises a laser output unit comprising two laser sources being VCSEL lasers. The device 1 also comprises a first optical element 20 being a mirror for redirecting the laser beams 5 from the laser output unit 4.

The device further includes a second optical element 21. The second optical element 21 is a reflecting and collimating lens (e.g. a Bragg reflector), which provides a plane wave illumination field on the user's eye 6. A part of the laser beam 5 is reflected back from the user's eye 6 and into the laser output unit 4. Hence, the laser output unit 4 is also a receiver unit for receiving the reflected light. The redirected light interferes with the emitted beam of light in the laser cavity of the laser 4 through self-mixing interference (SMI), which changes the output of the laser sources of the laser output unit 4. By monitoring the output intensity of the laser 4 (or the input voltage or input current to the laser 4), the direction and speed of movement of the user's eye 6 can be determined. The device also includes a processing unit 8 for determining the direction and speed of movement of the user's eye 6 based on SMI.

Although FIG. 5 shows the laser beam 5 of this example illuminating the cornea 7, the laser beam may instead illuminate the sclera (the area outside of the cornea 7) of the eye 6 of the user/wearer of the glasses.

Figure 6:
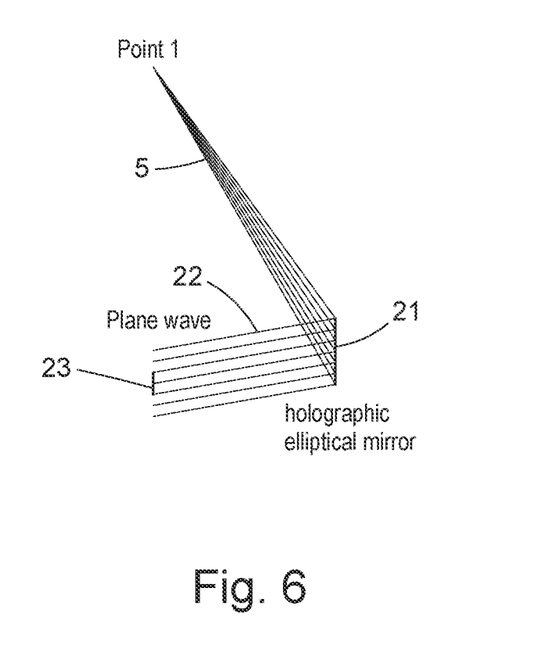
FIG. 6 illustrates a holographic elliptical mirror for use in the VR or AR headset of FIG. 5.

The second optical element may be holographic elliptical mirror as shown in FIG. 6. FIG. 6 shows a schematic diagram of a diverging laser beam 5 reflected from a holographic elliptical mirror 21 to provide a plane wave illumination field 22 on a target 23 (e.g. a user's eye).

In other embodiments, the laser output unit 4 may be placed in the frame in front of the eye 6 and transmit the laser beams 5 directly onto the user's eye, without requiring a reflective element. Also, it is not necessary to have the laser sources in the laser output unit 4. Instead, the laser sources may be placed off the device and be connected to waveguides for transmitting the laser beams 5.

FIG. 7 illustrates a schematic of a laser used in a device for determining eye movement. The laser 4 may be a diode laser having a diode junction in a laser cavity 13 between a pair of mirrors, including a first (known as an out-coupling) mirror 16 and a second (known as a high-reflectance) mirror 15. The first and second mirrors 15, 16 have reflective surfaces that face one another to form the laser cavity 13 in between them. The first mirror 15 is partially transmissive to allow a portion of the generated light out of the laser cavity 13 and to allow a portion of the redirected light to re-enter the laser cavity 13.

When the drive current is turned on, light is emitted in the diode junction and reflected back and forth between the pair of mirrors 15, 16. A fraction of the circulating light exits the laser cavity 13 through the out-coupling mirror 16 as a laser beam 11. When the emitted laser beam 11 hits a user's eye 6, a portion of the light 12 is redirected from the user's eye and redirected back towards the laser 4. A portion of the redirected light 12 enters the laser cavity 13 and mixes with the light circulating in the laser cavity 13 to create self-mixing interference 14.

If the user's eye 6 is moving at a velocity $v_r$, the frequency of the redirected light 12 will be altered by an amount $f_D$, due to a Doppler shift and according to the equation:

$$f_D = \frac{2v_r}{\lambda},$$

where $\lambda$ is the wavelength of light emitted 11 by the laser 4 and given by the laser cavity 13. The sign of the frequency change $f_D$ is dependent on the relative direction of the movement of the user's eye in relation to the emission direction of the light 11 incident on the user's eye.

Figure 8:
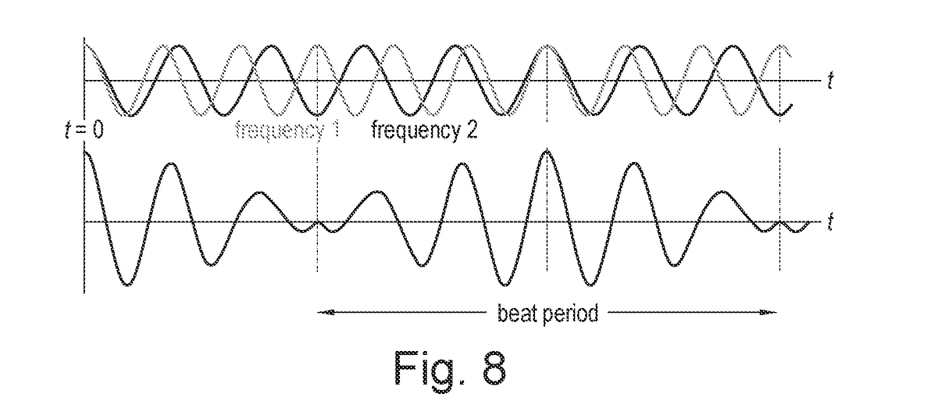
FIG. 8 shows a self-mixing interference of light within a laser cavity of the laser of FIG. 6.

Light emitted 11 from the laser 4 has a frequency f, and light redirected from the user's eye will therefore have a Doppler shifted frequency of $f \pm f_D$. As shown in FIG. 8, the self-mixing interference 14 of the emitted beam 11 and the redirected beam 12 will therefore include a beat signal of:

$$f - (f \pm f_D) = \pm f_D$$

The self-mixing interference (SMI) changes the output of the laser 4. By monitoring the output intensity of the laser 4 or the input voltage or input current to the laser 4, the direction and speed of movement of the user's eye 6 can be determined. The device also includes a processing unit (not shown) for determining the direction and speed of movement of the user's eye 6 based on the output intensity of the laser 4 or the input voltage or input current to the laser 4.

The Doppler shift is also present in the voltage of the laser when driven at a constant current, the current of the laser when driven at constant voltage, and in a current or voltage generated by a photodetector that detects the self-mixing interference.

The wavelength of the emitted light 11 from the laser may be modulated by a triangular waveform, having a beat frequency. This can be done by applying a modulated triangular ramp current to the laser, which results in a phase change of electric field of the laser. If the eye is rotating, the light redirected from the user's eye will experience a Doppler shift. By calculating a Fourier transform (FFT) of the SMI signal corresponding to each half period of the triangular waveform of the current (i.e. when the current is increased, and then when the current is decreased), and then subtracting the two FFT values, it is possible to obtain the speed of rotation and direction of rotation (using the output sign of the calculation).

Figure 9A:
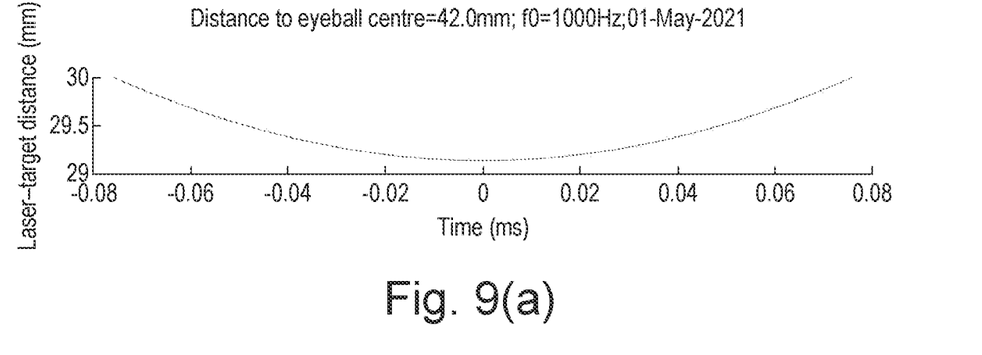
FIGS. 9(a) 9(b), 9(c) and 9(d) show eye displacement, a voltage signal, and photocurrent signal measuring the self-mixing interference of light.

FIG. 9(a) shows the distance between the laser and a moving target, and therefore displacement of the target relative to the laser, in time. For example, this may show the distance between the laser and a user's eye. In this figure, the time scale is centred at zero when the laser is pointing at the centre of the eye and there is a smallest distance between the laser and the user's eye.

Figure 9B:
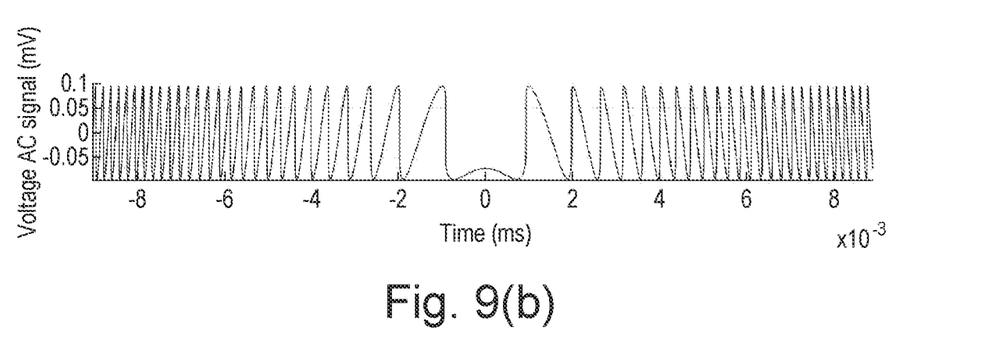
Figure 9C:
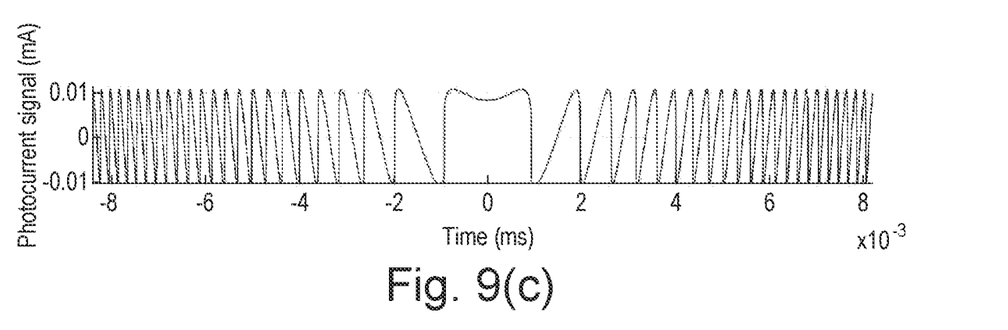
Figure 9D:
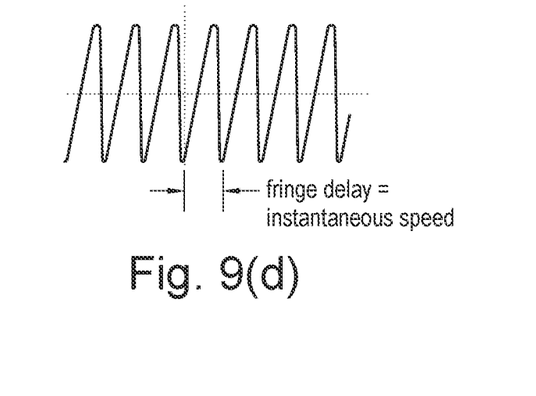

FIG. 9(b) shows the voltage signal of the laser and FIG. 9(c) shows the photocurrent of a photodiode measuring the SMI, corresponding to the displacement of the target relative to the laser as shown in FIG. 9(a). In the time domain, the voltage signal and photocurrent signals are typically a rounded sawtooth (or distorted cosine), with a periodicity that is proportional to the instantaneous speed of movement of the user's eye as shown in FIG. 9(d). Depending on the signal feed-back, the voltage or current signal can change from a sin or cos function to a sawtooth function and further to a chaotic multi-evaluated function. The asymmetry of the rounded sawtooth signal makes the signal change much steeper on one side of each 'tooth' than the other, which leads to a spike in the time derivative of the voltage signal. Dependent on the direction of the movement of the user's eye, the Doppler-shifted voltage has a longer or shorter wavelength, which defines if the sawtooths have their maximum shifted to the left or right.

The voltage signal of a laser and the photocurrent of a photodiode measuring the SMI due to an eye rotating at a fixed distance would also be similar to those shown in FIGS. 9(b) and 9(c).

Figure 10:
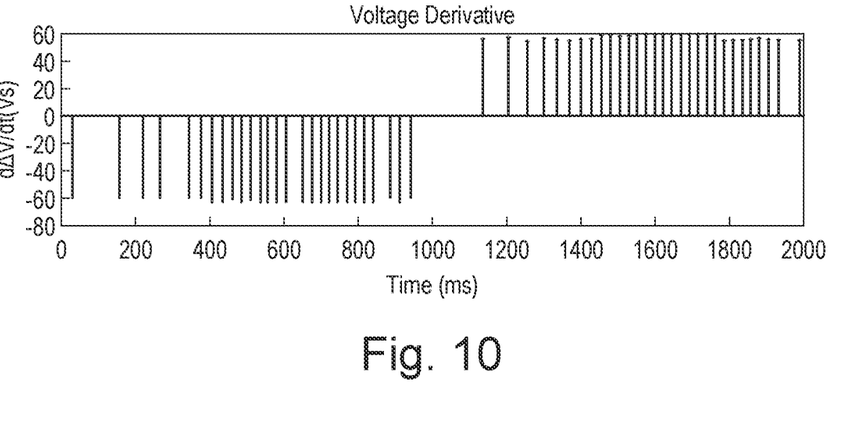
FIG. 10 shows a time derivative of the voltage signal shown in FIG. 9(b) or photocurrent signal shown in FIG. 9(c)

Depending on whether the sawtooth are leaning to the left or right, the spikes in the derivate have positive or negative polarity as shown in FIG. 10, therefore the direction of movement can be determined. If the sawtooth are leaning to the left, this implies movement in a first direction, and if the sawtooth are leaning to the right, this implies movement in a direction opposite to the first direction.

Figure 11:
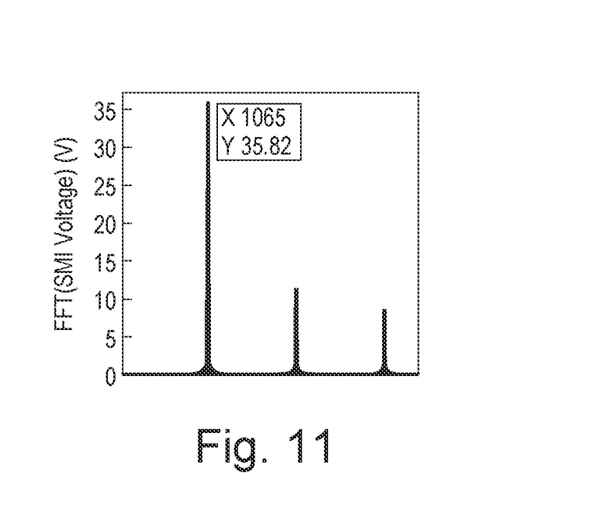
FIG. 11 shows a fast Fourier transform of the voltage signal measuring the self-mixing interference.

A fast Fourier transform (FFT) of the voltage signal may include a number of frequency components as shown in FIG. 11, including a DC component at frequency 0 and a fundamental beat. The strongest frequency component of the interference signal can be interpreted as the frequency component caused by the Doppler shift between the electromagnetic radiation generated by the laser and electromagnetic radiation received back into a resonant cavity of the laser. In this example, the frequency component of the Doppler shift is 1065 Hz.

In the frequency domain, the asymmetry leads to a change in sign of the phase of the Fourier transform. This change in sign also allows the detection of direction of movement.

The laser 4 of FIG. 7 can be used with a processing unit as a device for determining eye movement that has the advantages of:

Enabling direct velocity measurements;
Having a very short response time;
Involving no mechanically moving parts;
Requiring no significant recalibrations;
Requiring no separate light detector;
Having practically no sensitivity to disturbances from ambient light, due to required interference;
Being able to be combined with other technologies to detect the absolute direction of the gaze.

This provides a simple, robust, and fast method and device for determining eye movement direction and speed.

The device has a low power consumption (due to relatively low processing power required for the direct velocity measurements, no photodetector required, and use of VCSELs, which have a very low power consumption).

The laser used may be VCSELs, which can be very small, such that the device can be realized in a very space-saving manner. Furthermore, no additional space is required for separate photo detectors.

FIGS. 12(a) to 12(d) illustrate alternative configurations of a VCSEL 4 and a photodiode 17 used in a device for determining eye movement. The self-mixing interference 14 can be detected at any point along the beam path of the emitted light 11 and the redirected light 12. The photodiode 17 may detect the optical power of the beam, which modulates due to the self-mixing interference within the optical cavity of the laser. This allows a high degree of flexibility of the placement of the photodetector 17, and therefore a high flexibility in the design of the device. Furthermore, the optical signal of the photodiode 17 is less noisy than the obtained electrical signal of the laser 4. Additionally, in at least the embodiments shown in FIGS. 12(a), 12(b), and 12(d), the photodetector may be a constant position relative to the VCSEL, therefore removing the need for calibration.

Figure 12A:
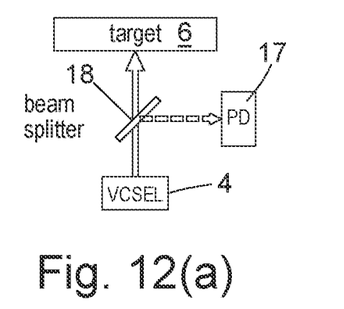
FIGS. 12(a) to 12(d) illustrate alternative configurations of a VCSEL and a photodiode used in a device for determining eye movement.

FIG. 12(a) illustrates a first configuration in which a beam splitter 18 is located along the beam path. A portion of the beam (which has undergone self-mixing interference) is redirected towards a photodetector 17, which is laterally spaced from the laser 4, by the beam splitter 18. In this example, the beam splitter 18 is located at an angle of 45° relative to the beam path. The beam splitter can be positioned close to the out-coupling mirror of the laser 4. The beam splitter may let the majority of the light exiting the exit mirror pass through the beam splitter 18 and reflect a portion to the photo detector 17.

Figure 12B:
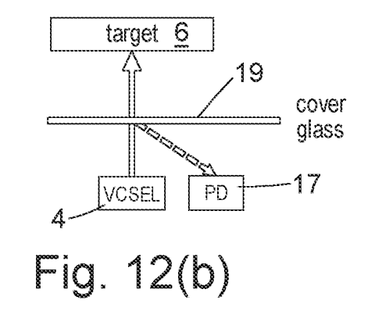

FIG. 12(b) illustrates a second configuration in which a cover glass 19 acts a beam splitter to redirect light towards a photodetector 17, which is laterally spaced from the laser 4. In this example, the cover glass 19 is located perpendicular to the beam path.

Figure 12C:
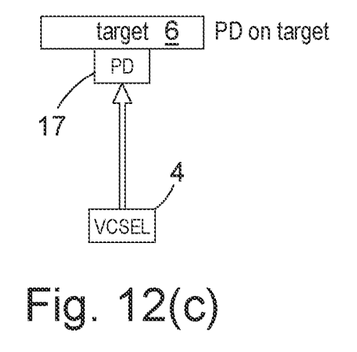

FIG. 12(c) illustrates a third configuration in which the photodetector 17 is located on or over the user's eye 6.

Figure 12D:
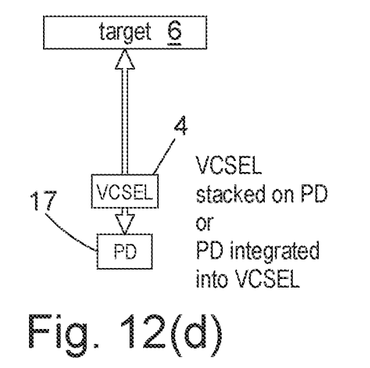
Figure 13:
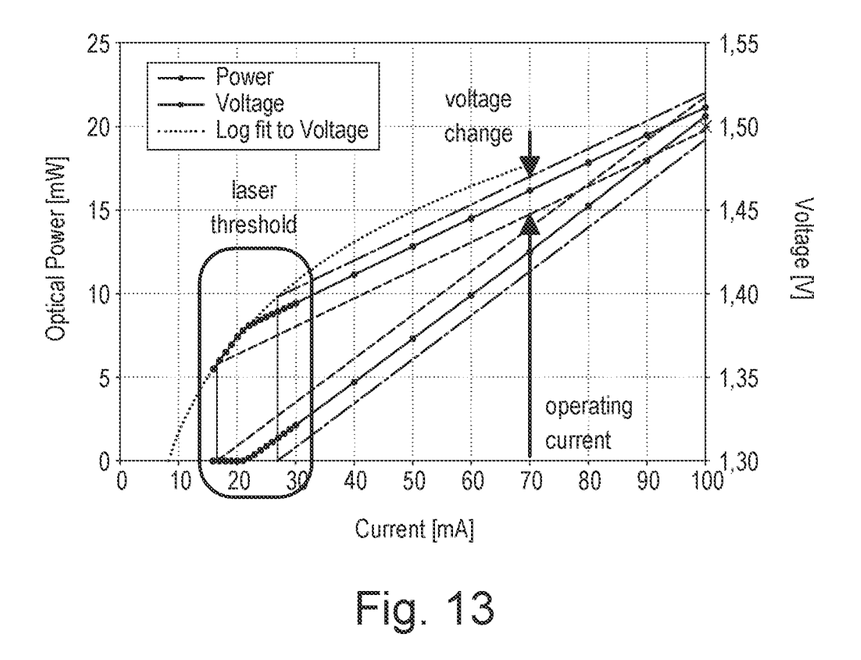
FIG. 13 illustrates voltage readout at the laser junction.

FIG. 12(d) illustrates a fourth configuration in which the photodetector 17 is located behind the laser 4. The back mirror (shown as the high-reflectance mirror of FIG. 7) can be made partially transmissive (for example, 99% reflective instead of 100% reflective), and the photo detector 17 is positioned close to that back mirror. In this example, a portion of the laser beam may exit the laser cavity through the high-reflectance mirror 15 to the photodetector 17. This may be achieved by stacking the laser 4 on the photodetector 17, or by integrating the photodetector 17 in the laser 4. This provides a more compact solution than using a spatially separated photodetector 17. FIG. 13 illustrates voltage readout at the laser junction. This demonstrates an alternative method of measuring the self-mixing interference using voltage readout. The feedback of the self-mixing interference causes a change in the laser threshold, and other operating parameters of the laser. This can be seen on the graph of FIG. 13. In consequence, the interferometric feedback modulates the laser junction voltage in the same way as the power on the photodetector. The perturbations in laser voltage can be used to determine the speed and direction of movement of the user's eye.

During operation of the device, an input signal for the laser can be monitored to measure the self-mixing interference and determine the direction and speed of movement of the user's eye. For example, the laser may be driven with constant current, and the change in voltage is measured, or the laser may be driven with constant voltage, and the change in current is measured. Electrical detection of the self-mixing interference removes the requirement for a separate photodetector.

The laser of FIG. 7 may be coupled with an electrical sensor such as a voltage sensor to measure a junction voltage of the laser. The voltage sensor can be capacitively coupled (e.g., AC-coupled) to a junction between the laser and a constant current driver circuit, and may sense the modulated voltage of the junction while removing the DC component of the junction voltage. A processing unit may compute an fast Fourier transform (FFT) of the self-mixing interference signal obtained from the junction voltage, and may determine a speed and direction of movement of the user's eye from the FFT (e.g., from a Doppler frequency) as described above.

Although some aspects of the embodiment have been described in terms of voltage modulation, embodiments of the invention may use current modulation or modulation of light output from the laser.

Although specific embodiment have been described above, the claims are not limited to those embodiments. Each feature disclosed may be incorporated in any of the described embodiments, alone or in an appropriate combination with other features disclosed herein.

REFERENCE NUMERALS

1 Smart glasses 11 Light generated by laser
2 Frame 12 Redirected light
3 Stem 13 Laser cavity
4 Laser 14 Self-mixing interference
4a First laser 15 High-reflectance mirror
4b Second laser 16 Out-coupling mirror
4c Third laser 17 Photodetector
4c Fourth laser 18 Beam splitter
5 Laser beam 19 Cover glass
6 Eye 20 First optical element
7 Cornea 21 Second optical element
8 Processing unit 22 Plane wave illumination
9 Sclera 23 Target
10 Eyelid

The invention claimed is:

1. A method for operating a display of a virtual reality (VR) or augmented reality (AR) headset, the method comprising:
   determining a direction of movement of a user's eye;
   estimating a future gaze direction from the determined direction of movement; and
   rendering an image on the display comprising higher resolution image data in a region comprising the estimated gaze direction and lower resolution image data outside of the region comprising the estimated gaze direction, wherein determining a direction of movement of the user's eye comprises:
   illuminating the user's eye with a first pair of lasers, wherein the first pair of lasers comprises a first laser and a second laser,
   wherein the first laser is configured to emit light in a first direction, and wherein the second laser is configured to emit light in a second direction, wherein the second direction is nonparallel to the first direction;
   illuminating the user's eye with a second pair of lasers, wherein the second pair of lasers comprises a third laser and a fourth laser,
   wherein the third laser is configured to emit light in a direction parallel to the first direction and wherein the fourth laser is configured to emit light in a direction parallel to the second direction;
receiving, at the first laser, light redirected from the user's eye, such that self-mixing interference occurs within a laser cavity between light generated by the first laser and the light redirected from the user's eye;
measuring the self-mixing interference; and
determining a direction of movement of the user's eye from the measured self-mixing interference.

2. The method according to claim 1, wherein illuminating the user's eye comprises illuminating only a sclera of the user's eye.

3. The method according to claim 1, wherein the method further comprises determining a speed of movement of the user's eye from the measured self-mixing interference.

4. The method according to claim 1, wherein determining the direction of movement of the user's eye from the self-mixing interference comprises determining the direction of movement of the user's eye from self-mixing interference caused by a Doppler shift of the redirected light due to movement of the user's eye.

5. The method according to claim 4, wherein determining the direction of movement of the user's eye from self-mixing interference caused by a Doppler shift of the redirected light due to movement of the user's eye comprises performing a Fourier transform on the measured self-mixing interference.

6. The method according to claim 1, wherein measuring the self-mixing interference comprises measuring a voltage or current of the first laser.

7. A virtual reality (VR) or augmented reality (AR) headset comprising:
a frame for mounting to a user's head;
a device for determining eye movement integrated in or located on the frame, the device comprising:
a first laser configured to emit a beam of light for illuminating the user's eye when in use and to receive light redirected from the user's eye, such that self-mixing interference occurs within a laser cavity between light generated by the first laser and the light redirected from the user's eye;
a measurement apparatus configured to measure the self-mixing interference; and
a processing unit configured to determine a direction of movement of the user's eye from the measured self-mixing interference, wherein the processing unit is further configured to estimate a future gaze direction from the determined direction of movement of the user's eye; and
a display configured to render an image on the display comprising higher resolution image data in a display region in the determined future gaze direction and lower resolution image data outside of the display region in the determined future gaze direction;
a first pair of lasers each configured to emit a beam of light for illuminating the user's eye when in use, wherein the first pair of lasers comprises the first laser and a second laser, and wherein the first laser is configured to emit light in a first direction, and wherein the second laser is configured to emit light in a second direction, wherein the second direction is nonparallel to the first direction; and
a second pair of lasers each configured to emit a beam of light for illuminating the user's eye when in use, wherein the second pair of lasers comprises a third laser and a fourth laser, wherein the third laser is configured to emit light in a direction parallel to the first direction and wherein the fourth laser is configured to emit light in a direction parallel to the second direction.

8. The VR or AR headset according to claim 7, wherein the first laser is configured to emit light towards only a sclera of the user's eye.

9. The VR or AR headset according to claim 7, wherein the processing unit is further configured to determine speed of movement of the user's eye from the measured self-mixing interference.

10. The VR or AR headset according to claim 7, wherein the processing unit is configured to determine the direction of movement of the user's eye from self-mixing interference caused by a Doppler shift of the redirected light due to movement of the user's eye.

11. The VR or AR headset according to claim 7, wherein the first laser comprises a vertical cavity surface emitting laser; and/or wherein the measurement apparatus comprises a sensor configured to measure a voltage input or current input of the first laser.

12. The VR or AR headset according to claim 7, wherein the measurement apparatus comprises a photodetector.

13. The VR or AR headset according to claim 12, wherein the processing unit is configured to determine a frequency modulation of light incident on the photodetector; and/or wherein the first laser comprises a vertical cavity surface emitting laser and wherein the photodetector is integrated with the vertical cavity surface emitting laser as single semiconductor device; and/or wherein the photodetector is spatially separated from the first laser and wherein the device further comprises an optical element configured to redirect at least a portion of the self-mixing interference towards the photodetector.

14. The VR or AR headset according to claim 7, wherein the first laser is configured to emit the beam of light such that an optical axis of the emitted beam of light forms an acute angle with respect to a surface of the user's eye.

15. The VR or AR headset according to claim 7, wherein the device is configured such that an offset of the emitted beam of light from the first laser relative to a first plane bisecting the center of the user's eye is equal to an offset of the emitted beam of light from the third laser relative to the first plane bisecting the center of the user's eye, and wherein the device is configured such that an offset of the emitted beam of light from the second laser relative to a second plane bisecting the center of the user's eye is equal to an offset of the emitted beam of light from the fourth laser relative to the second plane bisecting the center of the user's eye.

16. The VR or AR headset according to claim 7, wherein the third laser is configured to emit light in a third direction, wherein the third direction is different to the first direction, and wherein the fourth laser is configured to emit light in a fourth direction different to the second direction and non-parallel to the third direction.

* * * * *